S. BACHMANN.
BOX.
APPLICATION FILED NOV. 6, 1916.
1,218,353. Patented Mar. 6, 1917.
5 SHEETS—SHEET 1.
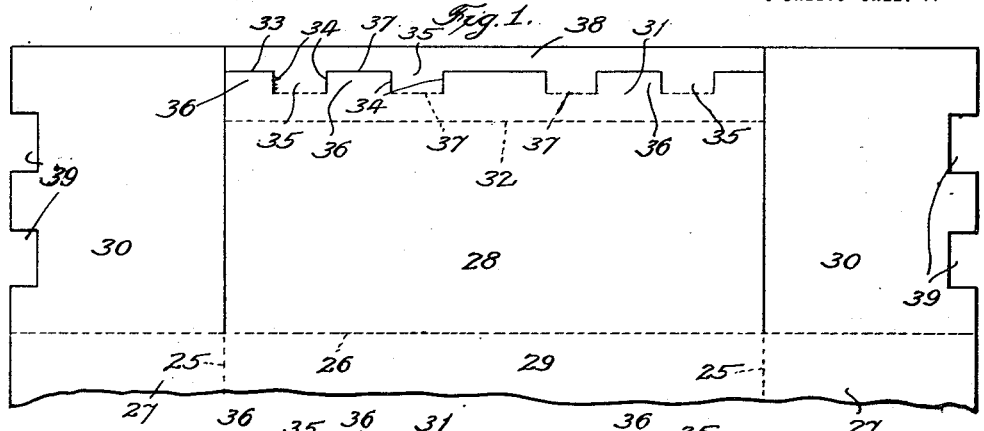
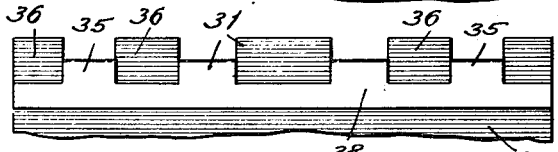
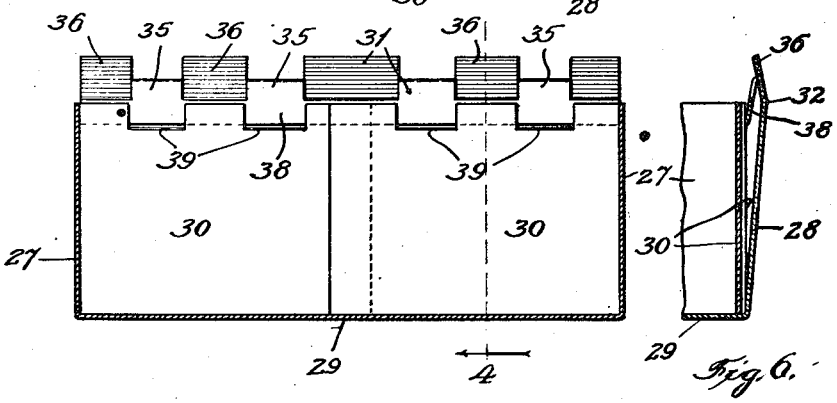
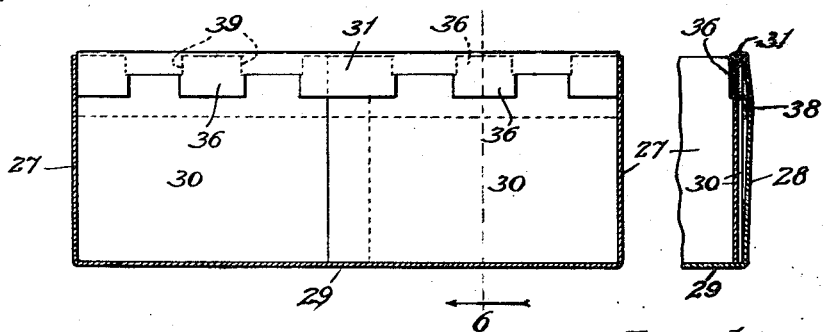
Inventor:
Siegmund Bachmann,
By Dyrenforth, Lee, Chritton & Wiles
Att'ys.

S. BACHMANN.
BOX.
APPLICATION FILED NOV. 6, 1916.
1,218,353.
Patented Mar. 6, 1917.
5 SHEETS—SHEET 2.
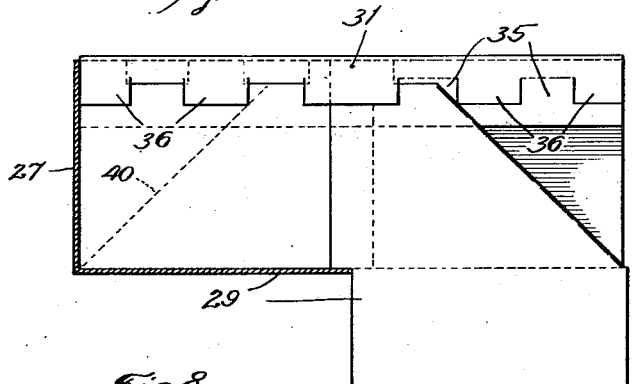
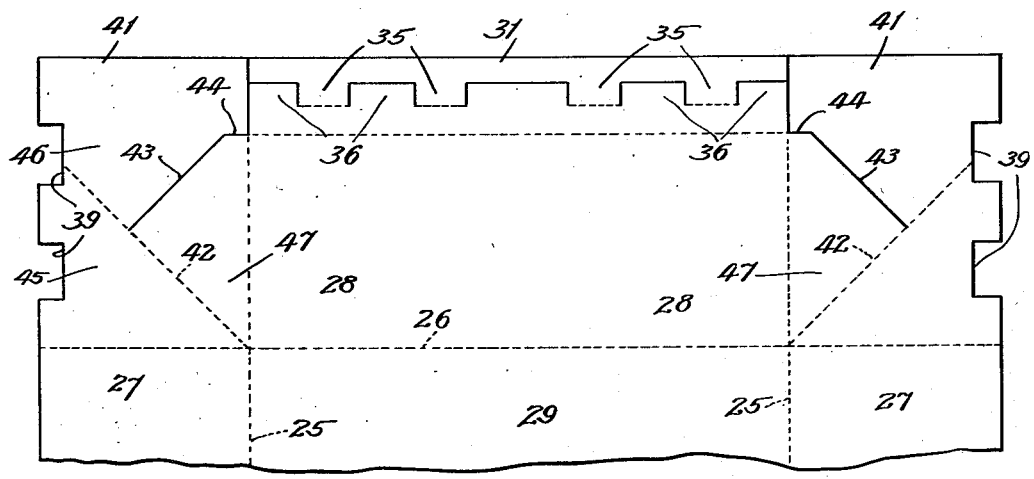
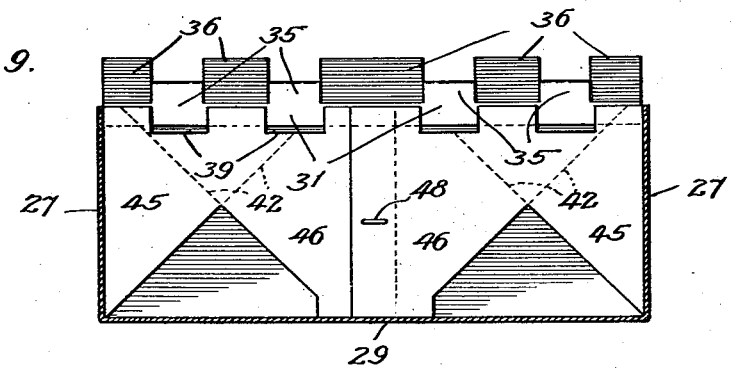
Witnesses:
Inventor:
Siegmund Bachmann,
By Dyrenforth, Lee, Chritton & Wiles
Attys.

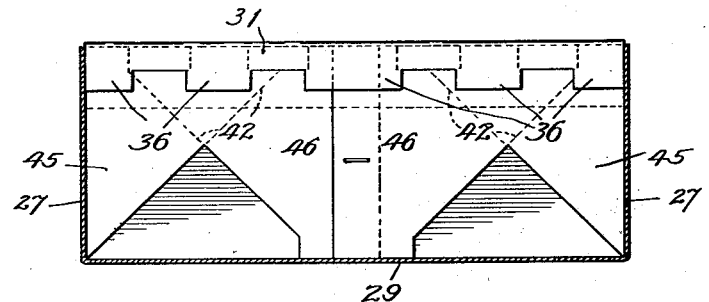
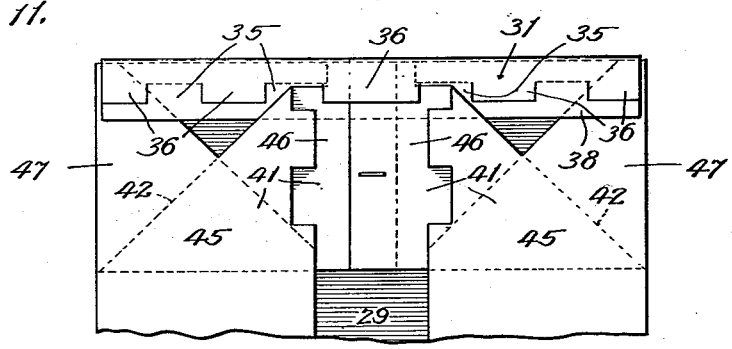
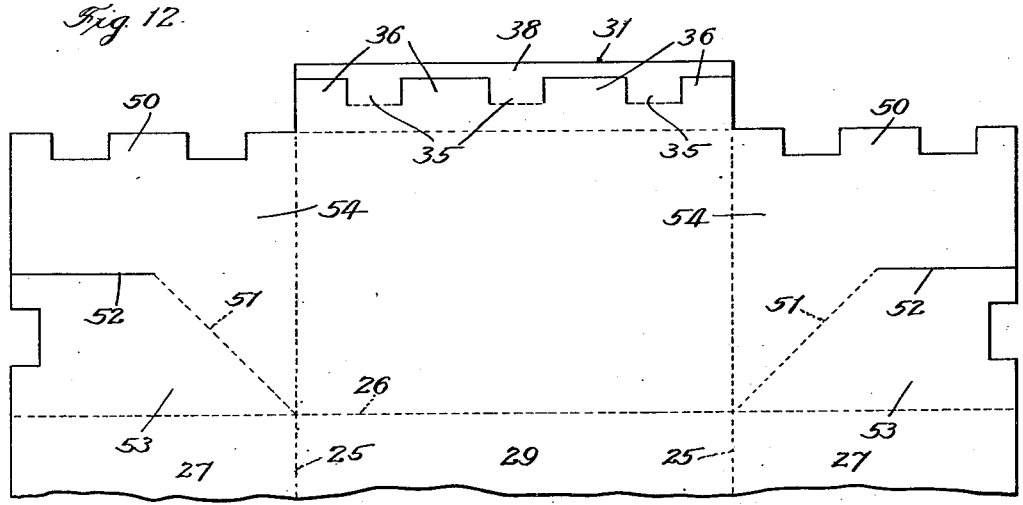

S. BACHMANN.
BOX.
APPLICATION FILED NOV. 6, 1916.

1,218,353.

Patented Mar. 6, 1917.
5 SHEETS—SHEET 4.

Witnesses:

Inventor:
Siegmund Bachmann,
By Dyrenforth, Lee, Chritton and Wiles
Att'ys.

S. BACHMANN.
BOX.
APPLICATION FILED NOV. 6, 1916.

1,218,353.   Patented Mar. 6, 1917.
5 SHEETS—SHEET 5.

Witnesses:

Inventor:
Siegmund Bachmann,
By Dyrenforth, Lee, Chritton and Wiles
Attys.

UNITED STATES PATENT OFFICE.

SIEGMUND BACHMANN, OF CHICAGO, ILLINOIS.

BOX.

1,218,353. Specification of Letters Patent. Patented Mar. 6, 1917.

Application filed November 6, 1916. Serial No. 129,723.

*To all whom it may concern:*

Be it known that I, SIEGMUND BACHMANN, a citizen of the United States, residing at Chicago, in the county of Cook and State of Illinois, have invented a new and useful Improvement in Boxes, of which the following is a specification.

My invention relates to an improvement in boxes more commonly formed of flexible box-board and involving a base, surrounding walls extending upwardly from the base, corner-extensions connected with walls of the box, and flaps on the latter overlying such extensions when the box is in erected condition; and my primary objects, generally stated, are to provide a construction of box of the type above referred to which may be readily and quickly erected, and preferably, collapsed when desired; which, when erected, will be held effectually in such condition against accidental collapsing; which will not require the flexing or springing of the ends of the flaps, whereby the latter in the erected box will lie flatwise against the inner sides of the box, and thus afford no obstruction to the removal of the contents therefrom; and generally to so improve boxes of the type above referred to that they will be rendered highly satisfactory for use.

Figure 13:
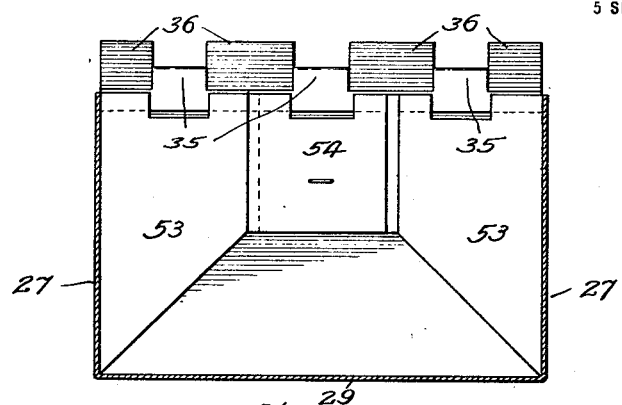
Figure 14:
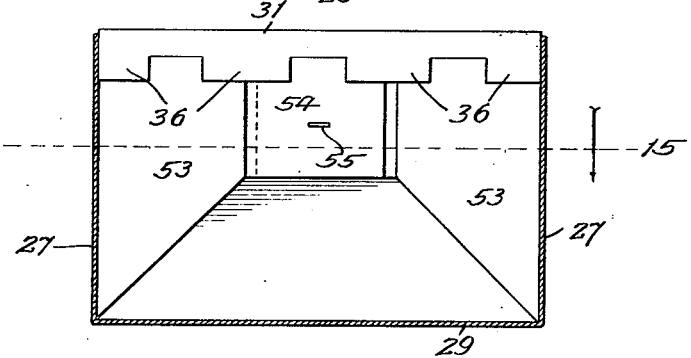
Figure 15:
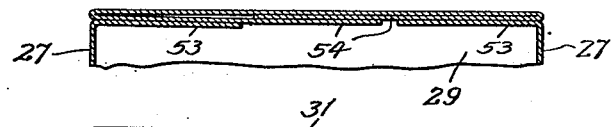
Figure 16:
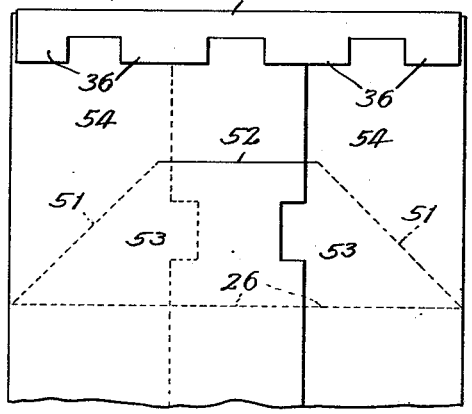
Figure 17:
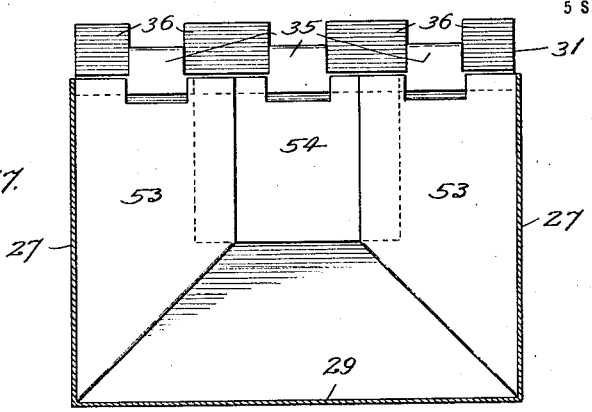
Figure 18:
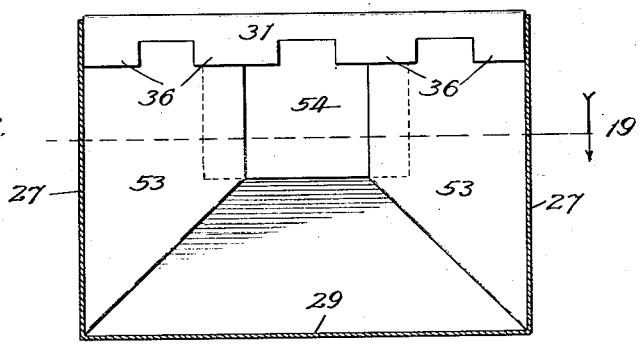
Figure 19:
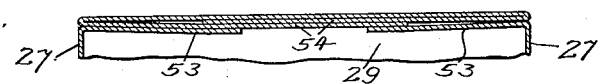
Figure 20:
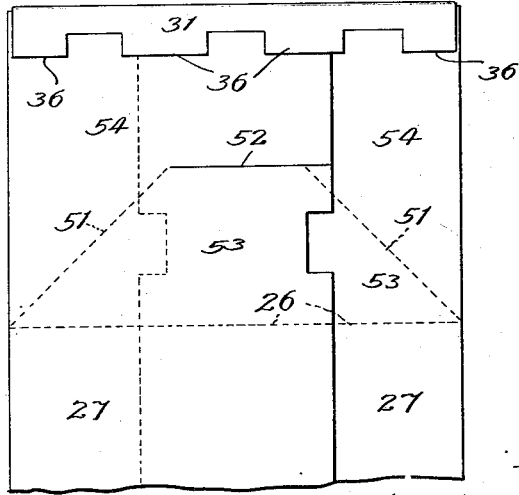

Referring to the accompanying drawings, Figure 1 is a broken plan view, showing one of the two similar ends, of a blank from which a box constructed in accordance with my invention may be formed. Fig. 2 is a similar view of the flap-equipped portion of the blank, the portion of the flap which underlies the corner-extensions of the box being shown as bent forwardly and upwardly to overlie the underlying portion of the flap. Fig. 3 is a vertical sectional view of a box constructed from the blank of the preceding figures, the corner-extensions being folded into place to overlie the extension-underlying portion of the flaps, with the extension-overlying portion of the flap in raised position. Fig. 4 is a section taken at the line 4 on Fig. 3 and viewed in the direction of the arrow. Fig. 5 is a view similar to Fig. 3 showing the flap in the position it assumes when moved to extension-overlying position for holding the box in erected condition. Fig. 6 is a section taken at the line 6 on Fig. 5 and viewed in the direction of the arrow, the foregoing figures representing a box wherein each corner-extension is connected with one wall only of the box, thus forming what is generally termed a cut-corner construction. Fig. 7 is a view diagrammatic in character, of a box of the same form as that illustrated in Figs. 1 to 6 inclusive, excepting that diagonal folding lines are shown as provided in the corner-extensions to permit the box to be collapsed, the left-hand end of the box being shown in erected condition and in vertical sectional elevation, and the right-hand end thereof in collapsed condition. Fig. 8 is a view like Fig. 1 of a blank from which a box of still another form in which my invention may be embodied, may be constructed. Fig. 9 is a view in vertical sectional elevation of the box made from the blank of Fig. 8, the walls of the box being shown in erected condition with the extension-overlying portion of the flap in raised condition. Fig. 10 is a view like Fig. 9 showing the box in fully erected condition, in which the flaps are in extension-overlying position. Fig. 11 is a plan view of the box of Figs. 8, 9, and 10, showing the box in collapsed condition, the box of Figs. 8, 9, 10 and 11 being of the uncut-corner, center-reinforced type. Fig. 12 is a view like Fig. 1 of the blank from which a box of still another form embodying my invention may be constructed. Fig. 13 is a view like Fig. 9 of the box formed from the blank of Fig. 12. Fig. 14 is a view similar to Fig. 13 but showing the box in fully erected condition. Fig. 15 is a section taken at the line 15 on Fig. 14 and viewed in the direction of the arrow. Fig. 16 is a plan view of the box of Figs. 12, 13, 14, and 15 in collapsed condition; and Figs. 17, 18, 19, and 20 are views like Figs. 13, 14, 15 and 16, respectively, of a modification of the construction illustrated in said last referred to figures.

Referring particularly to Figs. 1 to 7 inclusive, one of the similar ends of the blank from which the box of these figures is constructed is illustrated in Fig. 1 and consists of a rectangular sheet of box-board adapted to be folded along the parallel lines 25 and 26 to form the box-sides 27 and 28 respectively, hingedly connected with the base 29, the dotted lines 25 and 26 being, by preference, creases to facilitate folding the parts. The lines 25 intersect the lines 26 to form the four corner-portions, or extensions, 30 (two only being shown) of the blank, which are hingedly connected with the ends of the walls 27 along the outer extremities of the lines 26, but are severed from the walls 28 along the outer extremities of the lines 25, as shown by full lines. The outer edges of the walls 28 at opposite ends of the box carry flaps 31 secured to these walls along folding lines 32 which extend parallel with the folding lines 26, the flaps 31 being provided for holding the extensions 30 in place as hereinafter described when the box is erected. Each flap 31 is partially severed, intermediate the folding line 32 and the extreme outer edge of the flap, along the lines 33 and 34 to form tongues 35 and 36 which alternate with each other, each flap being provided with folding lines 37 in line with the bases of the tongues 36, the tongues 35 being connected together by a section 38 of the flap 31 formed by producing the tongues 35 and 36 as described.

The box may be erected in the following manner: The tongues 35 connected by the section 38 are folded upwardly along the folding lines 37 to cause them to overlie the other portions of the flaps 31 (Fig. 2). The walls 27 are then folded upwardly along the folding lines 25 to cause them to extend at right angles to the base 29, and the extensions 30 swung inwardly along the extremities of the folding lines 26 to cause them to extend inwardly, and the walls 28 thereupon swung upwardly along the lines 26 to cause the folded portions of the flaps 31 to lie between the walls 28 and the adjacent extensions 30 (Figs. 3 and 4) whereupon the flaps 31 are swung downwardly along the folding lines 32 to cause the tongues 36 to overlie the corner-extensions 30 (Figs. 5 and 6), the outer edges of the corner-extensions 30, which edges are uppermost when the box is erected, containing recesses 39 which register with the tongues 35, Fig. 3, and permit the parts to fold as just described.

The construction illustrated in Fig. 7 is the same as that illustrated in the preceding figures, excepting that the blank is preliminarily provided with folding lines, whereby the box may be collapsed when desired. To this end the corner-extensions 30 are provided with diagonal folding lines 40, and thus when it is desired to collapse the box (assuming it to be erected), this may be done by swinging the flaps 31 from the position illustrated in Figs. 5 and 6 to the position illustrated in Figs. 3 and 4, namely to the position wherein the tongues 36 are swung out of a position in which they overlie the extensions 30, and the walls 27 then swung inwardly and downwardly, and the walls 28 swung outwardly and downwardly as represented in the right-hand side of Fig. 7. If desired, after the collapsing operation the flaps 31 may again be folded inwardly along the lines 32 to cause the tongues 36 to overlie the folded portions of the box at the ends of the latter, the overlying portions 36 of the flaps 31 securely holding the parts of the box in collapsed condition.

The box may be readily erected from collapsed condition by first lifting the tongues 36, as hereinbefore described, to cause them to extend out of the path of the movable sections of the corner-extensions 30 (Figs. 3 and 4), and then swinging the walls 27 upwardly and outwardly, and the walls 28 upwardly and inwardly to cause all of these walls to extend at right angles to the base 29.

As soon as the walls and corner-extensions of the box have been moved to the position just described, in which position the sections of the flaps 31 will occupy the positions illustrated in Fig. 4, the operator pushes the flaps 31 downwardly to cause the tongues 36 to overlie the corner-extensions 30 (Fig. 6).

It will be manifest that the corner-extensions 30 may be secured to the walls 28 in the overlying position they assume thereon when the box is erected or is in the collapsed condition illustrated at the right-hand side of Fig. 7, as by any suitable means, as for example staples, not shown.

The construction illustrated in Figs. 8, 9, 10, and 11 is the same as that illustrated in the preceding figures, excepting as to the form of the corner-extensions, which in this construction are illustrated at 41. The box of these figures is of the type known as the uncut-corner center-reinforced variety. In this case the corner-extensions 41 are connected with the walls 27 and 28 along folding lines forming extensions of the lines 25 and 26, the folding lines 25 extending out to the folding lines 32, and the blank being cut along the extremities of the lines 25, as represented by full lines in Fig. 8. Each extension 41 is also provided with a diagonal folding line 42 which reaches from the intersection of the lines 25 and 26 to the outer edge of the extension 41, the extensions 41 being severed along lines 43 and 44, as represented in Fig. 8. The formation of the extensions 41 as described, causes each to present three sections 45, 46, and 47, the section 45 being hingedly connected with the end of the adjacent wall 27 along the extremity of the line 26, and with the sections 46 and 47 along the diagonal folding line 42, and the section 47 being connected with the end of the adjacent wall 28 along the extremity of the folding line 25.

The box may be erected as follows: The portions of the flaps 31 formed of the tongues 35 and sections 38 are first swung to the position illustrated in Fig. 4, and the walls 27 and 28 thereupon swung upwardly and inwardly to cause them to extend at right-angles to the base 29, the extensions 41 in this movement folding inwardly along the lines 42, thus causing the sections 45 to overlie the sections 47, (Fig. 9) the latter folding against the inner sides of the adjacent walls 28, in which condition the sections 46 of the extensions 41 will lie against the walls 28, and, in accordance with the construction illustrated, will overlap at their inner edges (Fig. 9). In thus manipulating sections 45 and 46 the extensions 41 will be carried into a position in which they overlie the portions of the flaps 31 comprising the tongues 35 and sections 38, (Fig. 9) and thus upon pushing the flaps 31 downwardly to cause them to fold along the folding lines 32 from the position illustrated in Fig. 4 to that illustrated in Fig. 6, the tongues 36 will be caused to overlie the sections 45 and 46 of the extensions 41 (Fig. 10) and thus hold the parts of the box in erected condition, the extensions 41 being provided with recesses 39, as explained of the construction illustrated in Fig. 1.

It will be manifest that if it is not desired to provide a box wherein collapsing of the same is not preliminarily provided for, the folding lines 42 instead of extending to the extreme outer edges of the extensions 41 may terminate at their intersections with the diagonal lines of severance 43. Furthermore, if desired, the mutually overlapping ends of the sections 46 may be secured together or to the end-walls 28 as desired, by any suitable means, as, for example, staples as represented at 48.

When it is desired to collapse the box, the operator first swings the tongues 36 upwardly to permit them to extend out of the path of movement of the corner extensions, and the walls 27 are then swung downwardly and inwardly and the walls 28 outwardly and downwardly to the position illustrated in Fig. 11, the corner-extensions in this operation folding along the lines 42. When the box is thus collapsed, the flaps 31 may be moved to a position in which the tongues 36 overlie the adjacent folded portions of the box for holding them against accidental displacement (Fig. 11).

The construction illustrated in Figs. 12 to 16 inclusive is of the same general construction as the preceding figures, excepting as to the form of the corner-extensions of the box, which are represented at 50. These extensions are connected with the adjacent ends of the walls 27 and 28 along continuations of the folding lines 26, each of these extensions containing a diagonal folding line 51 which extends from the intersection of the lines 25 and 26 partway across the extension where it intersects a slit 52, which extends from said diagonal folding line to the outer edge of the extension 50 and preferably parallel with the lines 26, thus causing the extensions 50 to be divided into sections 53 and 54, these sections being connected together along the folding lines 51 and with the adjacent walls 27 and 28, respectively, along the extremities of the folding lines 26 and 25.

The box may be erected in the following manner: The flaps 31 are folded to the position illustrated of the flap in Fig. 4, and the walls 27 and 28 thereupon swung upwardly and inwardly to cause them to extend at right angles to the base 29, the extensions 50 in this operation folding inwardly along the diagonal lines 51 and the extensions of the lines 25 and 26 to the position illustrated in Fig. 13, the sections 54 of the extensions folding against the walls 28 and the infolded portions of the flaps and the sections 53 folding against the sections 54. After the parts have been positioned as described, the operator then presses down on the flaps 31 to cause the tongues 36 to overlie the corner extensions in their folded condition, as described and illustrated of the flaps shown in Fig. 6.

If desired, the extremities of the sections 54 may be secured to the walls 28, or secured together in mutually overlapping relation, or in such relation secured to the walls 28, where the proportions of the box are such that they will overlap as illustrated, as by any suitable means, as, for example, staples as represented of one end of the box at 55.

The box may be collapsed by first swinging the tongues 36 out of the path of movement of the extensions 50 (Fig. 13) and thereupon swinging the walls 27 inwardly and downwardly and the walls 28 upwardly and downwardly, the sections 53 of the corner-extensions 50 swinging along the diagonal folding lines 51, the walls and corner-extensions of the box in this operation assuming the position illustrated in Fig. 16. If desired, the flaps 31 may then be folded to cause them to extend in the position illustrated in Fig. 6, in which condition the tongues 36 will overlie the extensions 50 (Fig. 16).

The construction illustrated in Figs. 17, 18, 19, and 20 is the same as that illustrated in Figs. 13, 14, 15 and 16, excepting that the dimensions of the box are such as to cause the outer extremities of the sections 54 to extend into a position in which they will be overlapped by the adjacent sections 53.

It will be noted that in such of the constructions illustrated as show the corner-extensions secured in overlapped conditions to walls of the box, as by the staples shown, the flaps 31 may be manipulated to cause the portions thereof which overlie the corner-extensions when the box is erected, to be moved out of the path of movement of the corner-extensions, without disengaging the flaps at the portions thereof which lie behind the corner-extensions, and thus the boxes may be repeatedly quickly collapsed and erected without springing or flexing the end-portions of the flaps.

If desired, instead of erecting the box from knock-down condition as described of the various constructions shown, the blanks may be preliminarily folded into collapsed condition from knock-down condition, as will be manifest, and then when desired for use may be erected from collapsed condition.

It will also be noted that in manipulating the box from knock-down condition, namely the condition represented by the various illustrated blanks, to erected condition, or to collapsed condition, or in manipulating the box from erected condition to collapsed condition, or vice versa, the connecting section 38 permits of the proper positioning of the underlying portions of the flaps behind the extensions quickly and easily, as the tongues 35 and sections 38 are in effect a unitary structure, and when the box is in erected condition, it is held against accidental collapsing.

It will also be noted that by my improved box, I provide a plurality of tongues 35, which, in connection with the connecting sections 38, serve very effectually, in connection with the tongues 36, to hold the box against accidental collapsing.

If desired, those of the tongues which alternate with the tongues which overlie the corner-extensions when the box is erected, may be eliminated, but it is preferred that they be retained as they serve to stiffen the box especially where the boxes are of relatively great height.

While I have shown the boxes illustrated as provided with a certain number of interlocking sections, I do not wish to be understood as intending to limit my invention to the use of sections of the number shown, as the number may be increased or diminished as desired, without departing from the spirit of my invention. Furthermore, various other modifications and alterations may be made in the structures illustrated without departing from the spirit of my invention.

What I claim as new and desire to secure by Letters Patent is—

1. A box formed of a base, walls extending upwardly therefrom, corner-extensions connected with walls of the box and lying against adjacent box walls, and flaps on walls of the box overlying said extensions and provided with a plurality of sections connected together at their outer extremities and underlying said extensions.

2. A box formed of a base, walls extending upwardly therefrom, corner-extensions connected with walls of the box and lying against adjacent box walls, and flaps on walls of the box each provided with a plurality of sections connected together at their outer extremities and underlying said extensions and with sections overlying said extensions, for the purpose set forth.

3. A box formed of a base, walls extending upwardly therefrom, corner-extensions connected with walls of the box and lying against adjacent box walls, and flaps on walls of the box each formed with a plurality of sections connected together at their outer extremities and underlying said extensions and with sections arranged alternately with relation to said first-named sections and overlying said extensions.

4. A box formed of a base, walls extending upwardly therefrom, corner-extensions connected with walls of the box and lying against adjacent box walls, and flaps on walls of the box each formed with a plurality of sections spaced apart but connected together at their extremities and underlying said extensions and with tongues disposed between said sections and overlying said extensions.

5. A box formed of a base, walls extending upwardly therefrom, corner-extensions connected with walls of the box and lying against adjacent box walls, and flaps hingedly connected with walls of the box, each formed with sections overlying said extensions and with an extension-underlying section hingedly connected with the body-portion of the flap intermediate the connection of the flap with the box wall carrying it and the extremities of said extension-overlying sections.

6. A box formed of a base, walls extending upwardly therefrom, corner-extensions connected with walls of the box and lying against adjacent box walls, and flaps hingedly connected with walls of the box, each formed with sections overlying said extensions and with an extension-underlying section hingedly connected with the body-portion of the flap intermediate the connection of the flap with the box wall carrying it and the extremities of said extension-overlying sections, said extension-underlying section extending below said extension-overlying section, for the purpose set forth.

7. A box formed of a base, walls extending upwardly therefrom, corner-extensions connected with walls of the box and lying against adjacent box walls, and flaps hingedly connected with walls of the box, each formed with sections overlying said extensions and with a plurality of sections underlying said extensions, said last-referred-to sections being hingedly connected with the body-portion of the flap intermediate the connection of the flap with the box wall carrying it and the extremities of said first-named sections.

8. A box formed of a base, walls extending upwardly therefrom, corner-extensions connected with walls of the box and lying against adjacent box walls, and flaps hingedly connected with walls of the box, each formed with sections overlying said extensions and with a plurality of tongues connected together at their outer extremities and underlying said extensions, said tongues being hingedly connected with the body-portion of the flap intermediate the connection of the flap with the box wall carrying it and the extremities of said sections.

9. A box formed of a base, walls extending upwardly therefrom, corner-extensions connected with walls of the box and lying against adjacent box walls, and flaps hingedly connected with walls of the box, each formed with sections overlying said extensions and with a plurality of tongues alternating with said sections and connected together at their outer extremities and underlying said extensions, said tongues being hingedly connected with the body-portion of the flap intermediate the connection of the flap with the box wall carrying it and the extremities of said sections.

10. A box formed of a base, walls extending upwardly therefrom, corner-extensions connected with walls of the box and lying against adjacent box walls, and flaps hingedly connected with walls of the box, each of said flaps being formed of tongues of less depth than the flap and extending short of the free edge of the latter, with folding lines in certain of said tongues, those of said tongues which contain said folding lines being connected together at the free edge of the flap and beyond the other of said tongues and underlying said extensions and the other of said tongues overlying said extensions.

11. A box formed of a base, walls extending upwardly therefrom, corner-extensions connected with walls of the box and lying against adjacent box walls, and flaps hingedly connected with walls of the box, each of said flaps being formed of tongues of less depth than the flap and reaching short of the free edge of the latter and its hinged connection with the box wall carrying it, with folding lines in certain of said tongues, those of said tongues which contain said folding lines being connected together at the free edge of the flap and beyond the other of said tongues and underlying said extensions and the other of said tongues overlying said extensions.

12. A box formed of a base, walls extending upwardly therefrom, corner-extensions connected with walls of the box and lying against adjacent box walls, and flaps hingedly connected with walls of the box, each of said flaps being provided with a series of tongues hingedly connected with the body of said flap and underlying said extensions, the latter containing recesses in their upper edges registering with the said tongues, and each flap provided with a section overlying said extensions.

13. A box formed of a base, walls extending upwardly therefrom, corner-extensions connected with walls of the box and lying against adjacent box walls, and flaps hingedly connected with walls of the box, each provided with a series of tongues hingedly connected with the body of said flap and connected together at their outer extremities and underlying said extensions, the latter containing recesses in their upper edges registering with said tongues, and each flap provided with a section overlying said extensions.

14. A box formed of a base, walls extending upwardly therefrom, corner-extensions connected with walls of the box and lying against adjacent box walls, and flaps hingedly connected with walls of the box, each of said flaps being provided with a series of tongues hingedly connected with the body of said flap and underlying said extensions, the latter containing recesses in their upper edges registering with the said tongues, and each flap provided with a series of tongues overlying said extensions.

15. A box formed of a base, walls extending upwardly therefrom, corner-extensions connected with walls of the box and lying against adjacent box walls, and flaps hingedly connected with walls of the box, each provided with a series of tongues hingedly connected with the body of said flap, and connected together at their outer extremities and underlying said extensions, the latter containing recesses in their upper edges registering with said tongues, and each flap provided with a series of tongues overlying said extensions.

16. A box formed of a base, walls extending upwardly therefrom, corner-extensions connected with walls of the box and lying against adjacent box walls, and flaps hingedly connected with walls of the box, each provided with tongues, alternate ones of which are hingedly connected with the body of said flap and underlie said extensions, the latter containing recesses in their upper edges registering with said tongues, and the other of said tongues overlying said extensions.

SIEGMUND BACHMANN.